J. E. LUNDMARK.
ICE SAW.
APPLICATION FILED JULY 8, 1920.
1,356,640.
Patented Oct. 26, 1920.
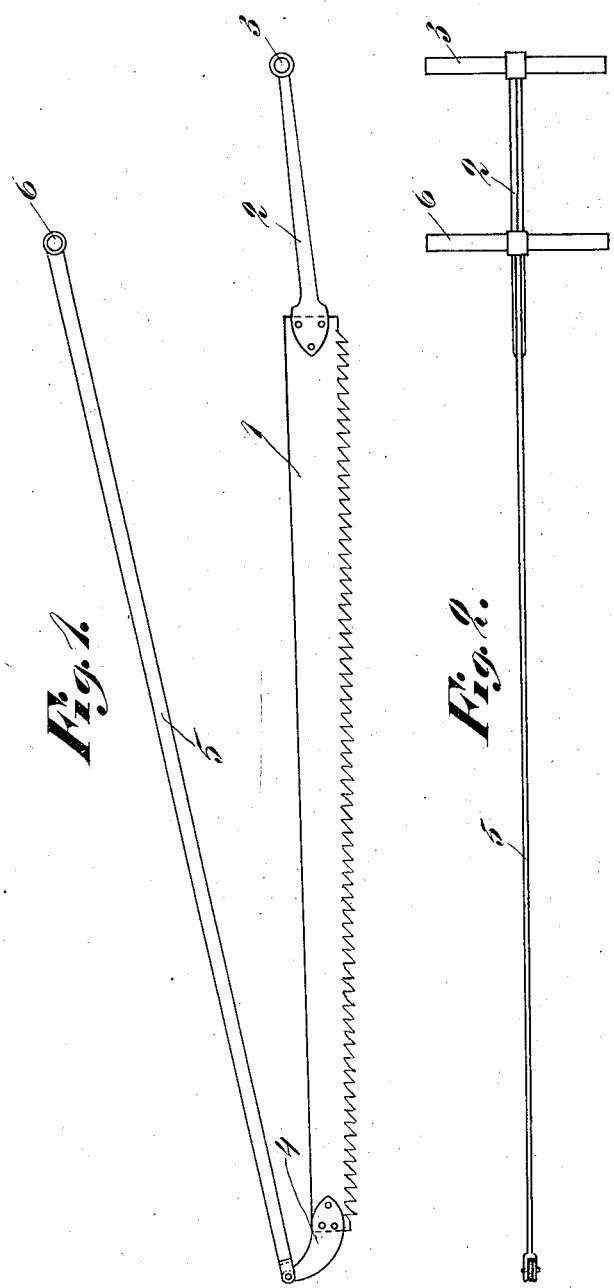
Inventor:
John Elis Lundmark
By Lawrence Langner
Attorney.

UNITED STATES PATENT OFFICE.

JOHN ELIS LUNDMARK, OF ÖSTERSUND, SWEDEN.

ICE-SAW.

1,356,640. Specification of Letters Patent. Patented Oct. 26, 1920.

Application filed July 8, 1920. Serial No. 394,778.

*To all whom it may concern:*

Be it known that I, JOHN ELIS LUNDMARK, a subject of the King of Sweden, and resident of Östersund, in the Kingdom of Sweden, have invented certain new and useful Improvements in Ice-Saws, of which the following is a specification, reference being had therein to the accompanying drawing.

For sawing ice by hand on a large scale, saws with long blades are mainly employed partly in order to enable the workman to stand in a convenient way while sawing and partly in order that the thickness of the ice shall not be an obstacle to the work. This arrangement is however attended with the drawback that the blade is apt to waver and furthermore can not be operated very powerfully inasmuch as only its upper end is accessible. Generally ordinary cross-cut-saws are employed, each operated by one workman who consequently must alone impart to the saw its motion and simultaneously press it against the ice.

My invention is an icesaw so designed that it can be operated by two workmen and worked upon at both ends simultaneously while sawing.

In the accompanying drawing a convenient form of the improved saw is illustrated, Figure 1 being a side elevation and Fig. 2 a plan view. According to the drawing 1 is the saw-blade the one end of which is firmly attached to an arm 2 which forms a support for a transverse handle 3. At the opposite end of the sawblade another arm 4 is attached which is bent outward in the plane of the blade. To the latter arm a thin bar 5 of suitable material is pivotally connected which bar is provided with a transverse handle 6 in its free end.

When the saw is to be used the bar 5 is turned up along the sawblade whereupon a workman takes hold of and operates this bar and another the sawblade. When sawing the latter is moved almost vertically and the bar is kept as near to the blade as possible. When the saw is pushed down the bar is simultaneously pushed down and when the saw is pulled up the bar at the same time is pulled up whereby waving of the sawblade is prevented and the working-pressure is evenly distributed all along the sawblade which materially facilitates the sawing. When the bar has entered the cut in the ice it serves as a good guide for the sawblade.

In order to give the bar sufficient rigidity without making it so thick that it will jam in the cut it may conveniently be made of doublebent steelplate.

Having now described my invention, what I claim as new and desire to secure by Letters Patent is:

In a saw, the combination of a saw blade provided at one end with a handle; an arm rigidly secured to the other end of the blade; and a bar pivoted at one end to said arm for swinging movement toward and away from the blade and in the plane of said blade, said bar having a handle at its free end.

In witness whereof, I have hereunto signed my name.

JOHN ELIS LUNDMARK.